United States Patent [19]

Needham

[11] Patent Number: 4,668,461
[45] Date of Patent: May 26, 1987

[54] POLYMERS AND ROTATIONALLY MOLDING SAME

[75] Inventor: Donald G. Needham, Ramona, Okla.

[73] Assignee: Phillips Petroleum Company, Bartlesville, Okla.

[21] Appl. No.: 608,523

[22] Filed: May 8, 1984

Related U.S. Application Data

[63] Continuation of Ser. No. 195,700, Oct. 9, 1980, abandoned.

[51] Int. Cl.$^4$ ................................................ C08F 8/42
[52] U.S. Cl. .................................... 264/310; 525/370
[58] Field of Search .......................................... 264/310

[56] References Cited

U.S. PATENT DOCUMENTS

| | | | |
|---|---|---|---|
| 3,214,422 | 10/1965 | Mageli | 260/94.9 |
| 3,265,649 | 8/1966 | Faltings | 260/23 H |
| 3,876,613 | 4/1975 | Needham | 525/332 |
| 3,891,597 | 6/1975 | Needham | 260/42.21 |
| 3,974,114 | 8/1976 | Sowa | 260/23 H |
| 4,021,380 | 5/1977 | Nuttall | 260/2.5 |
| 4,029,729 | 6/1977 | Rees | 526/230.5 |
| 4,115,508 | 9/1978 | Hughes | 525/332 |
| 4,166,890 | 9/1979 | Fried | 521/92 |
| 4,219,453 | 8/1980 | Sakurai | 260/23 H |

*Primary Examiner*—Paul R. Michl
*Attorney, Agent, or Firm*—French and Doescher

[57] ABSTRACT

A composition that can be rotationally molded with a minimum formation of voids comprises a polymer and a metal stearate.

9 Claims, 2 Drawing Figures

POLYMERS AND ROTATIONALLY MOLDING SAME

This is a continuation of application Ser. No. 195,700 filed Oct. 9, 1980 abandoned.

BACKGROUND OF THE INVENTION

This invention relates to a composition of matter and to a method of rotationally molding same. In another aspect this invention relates to an additive and to introducing the same into a rotational molding composition to improve the physical properties thereof. In still another aspect this invention relates to the addition of zinc stearate into rotational molding compositions containing crosslinking agents to prevent the formation of voids in the final rotationally molded article.

It is known in the art that optimum physical properties from polymers used in rotational molding processes, such as for example ethylene polymers, homopolymers as well as copolymers, require various crosslinking agents and additives to stabilize the molded polymer. It is also known that when polymers such as those disclosed above are treated with such crosslinking agents and stabilizing additives, problems develop in the final molded article due to the formation of surface pinholes. While surface pinholes can be eliminated in molded articles by omitting both the crosslinking agents and stabilizing additives, the molded articles produced therefrom are of questionable utility, inasmuch as exposure to heat, light, chemicals and temperature variations typically result in their failure because of deteriorating physical properties.

It is further known in the prior art that certain stearates are effective in reducing surface pinholes i.e. pinholes characterized as existing on the mold side of rotationally molded articles having a wall thickness of less than $\frac{1}{4}$ inch (0.635 centimeters). See U.S. Pat. No. 3,974,114 (1976). FIG. I is provided to illustrate surface pinholes as seen by the prior art.

The above cited patent, however, does not provide a suitable stearate responsive to a problem characterized as a mechanical failure of rotationally molded articles. Mechanical failure occurs in rotationally molded articles having a wall thickness of at least greater than $\frac{1}{4}$ inch (0.635 cm), e.g. $\frac{1}{2}$ to $\frac{3}{4}$ inch (1.3–1.9 cm). Rotationally molded articles of at least greater than $\frac{1}{4}$ inch (0.635) thickness can rupture when placed in their designated end-use due to the presence of voids therein. FIG. II is provided to illustrate the problem characterized by the presence of voids in the inner wall of molded articles having a wall thickness of at least greater than $\frac{1}{4}$ inch.

Voids are generally tear drop shaped openings having the small end of the opening adjacent the mold wall side and the large end of the opening adjacent the inner wall. The starting point of the void is dependent to some extent upon the wall thickness of the molded article. When the walls are on the order of $\frac{1}{2}$ to $\frac{3}{4}$ inch in thickness, the voids typically begin about $\frac{1}{8}$ inch (0.32 cm) below the surface adjacent the mold wall side. Voids have been observed to exhibit three basic characteristics: They can be seen to terminate before reaching the inner wall; to penetrate the inner wall as will be evidenced by a cavity at the large end of the tear shaped void; or as is generally the case, to protrude from the inner wall and appear as a blister covered by a thin plastic skin of about 0.025–0.051 mm in thickness.

It is therefore an object of this invention to provide a composition of matter suitable for producing rotationally molded articles with a minimum formation of voids. Another object of the invention is the production of rotationally molded articles with a minimum formation of voids.

STATEMENT OF INVENTION

According to the invention a composition of matter is provided comprising a polymer and a metal stearate wherein the polymer is selected from the group consisting of ethylene homopolymer, a copolymer of ethylene and at least one acyclic straight or branched chain mono-1-olefin hydrocarbon having 3 to 8 carbon atoms per molecule and mixtures thereof and the metal stearate is zinc.

Further according to the present invention a method is provided for reducing the formation of voids in rotationally molded articles having a wall thickness of at least $\frac{1}{4}$ inch (0.635 centimeters), produced by rotationally molding the above composition.

Further according to the present invention rotationally molding the above composition produces articles having a wall thickness of at least greater than $\frac{1}{4}$ inch (0.635 centimeters) and a minimum formation of voids therein.

Figure 1:
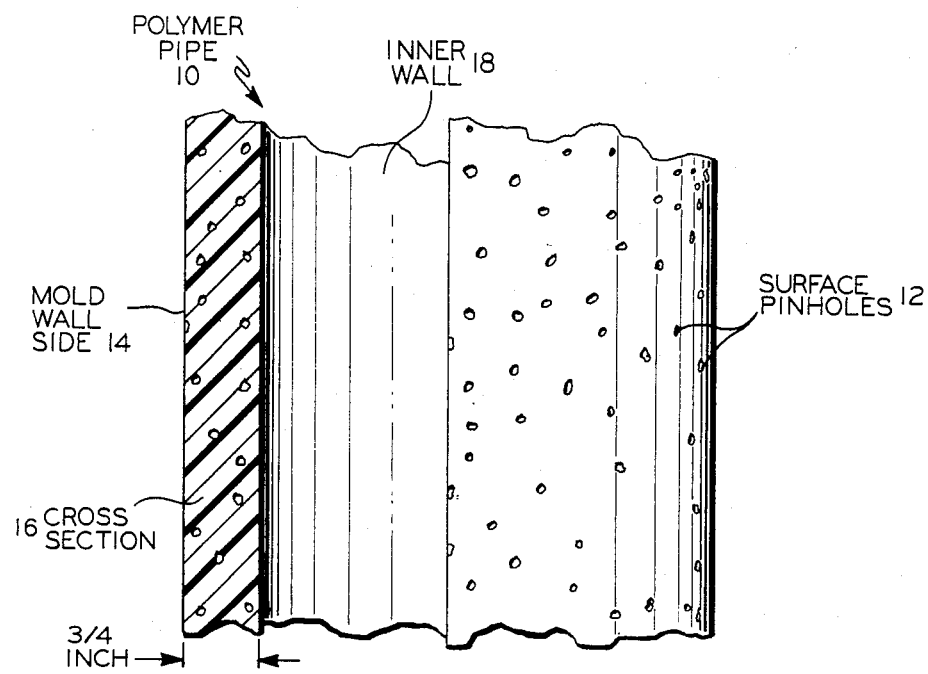
FIG. 1 is a half-section of polymer pipe illustrating surface pinholes as seen by the prior art.
Figure 2:
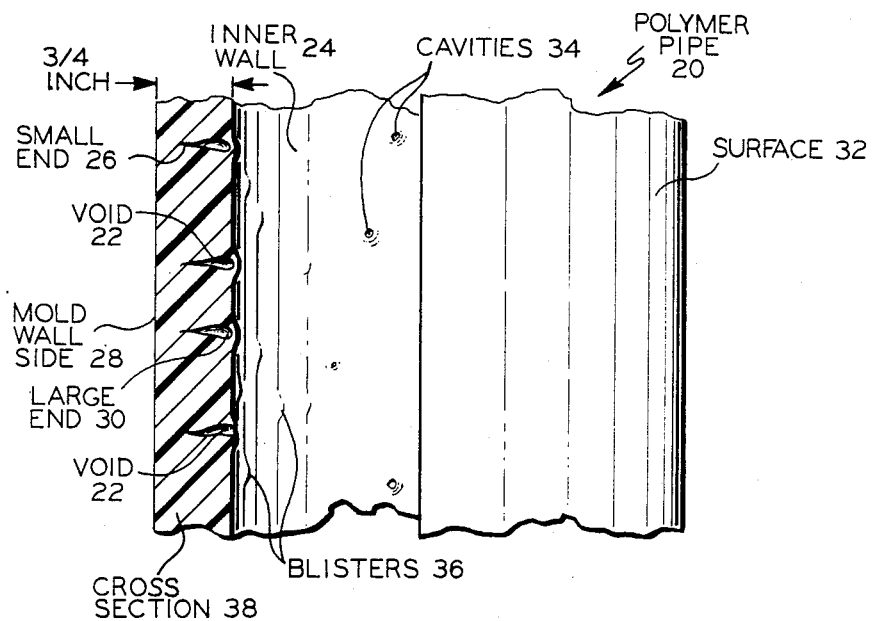

FIG. II is a half-section of polymer pipe illustrating voids.

DETAILED DESCRIPTION OF DRAWING

FIG. I is a half-section of polymer pipe 10 having a wall thickness of $\frac{3}{4}$ inch. Surface pinholes 12 are generally formed on the mold wall side 14 of rotationally molded articles. Surface pinholes 12 are believed to be related to uneven surface tension between the mold and the plastic resin being molded.

Three methods are known to prevent pinholes on the exterior surface of roto-molded parts.

1. Coat the mold, which will contact the plastic resin, with a mold release agent (surfactant). The mold release agent functions by equalizing the surfact tension (adhesion) between the mold and the plastic resin being molded.

1. Blend a wetting agent into the plastic resin which is to be molded. Wetting agents consist of stearic acid, metal stearates, low molecular weight waxes and certain glycols which function by migrating through the plastic at a low temperature to form a thin film on the surface of the heated mold. Wetting the mold surface in this manner tends to equalize the surface tension between the mold and the plastic resin.

3. Coat or dust a metal stearate onto the plastic resin prior to molding. This method forms a heavier film on the mold and is used only when the pinhold problem is severe.

The inner wall 18 of pipe 10 is smooth in appearance without surface pinholes 12.

Cross-section 16 illustrates the alignment of surface pinholes 12 within the inner wall 18 of a rotationally molded article having a wall thickness of $\frac{3}{4}$ inch.

FIG. II is a half section of polymer pipe 20 having $\frac{3}{4}$ inch wall thickness. Voids 22 are formed within the inner wall 24 (shown in cross-section 38). Voids 22 are generally tear drop openings having the small end 26 of the opening adjacent the mold wall side 28 and the large end 30 of the opening adjacent the inner wall 24. When the wall of rotationally molded articles is on the order of ⅛ to ¾ inch in thickness, voids 22 typically begin about ⅛ inch (0.32 cm) below the surface 32 adjacent the mold wall side 28. Voids 22 have been observed to exhibit three basic characteristics: They can be seen to terminate before reaching the inner wall 24; to penetrate the inner wall 24 as will be evidenced by a cavity 34 at the large end 30 of the tear shaped void 22; or as generally the case, to protrude from the inner wall 24 and appear as a blister 36 covered by a thin plastic skin of about 0.025-0.051 millimeters in thickness.

Tear drop shaped voids are often formed within the cross-section of the wall during the rotomolding cycle. These voids form in thick wall parts of one-fourth inch or more thickness.

As the temperature of the powdered resin within the mold rises, the resin softens or melts and adheres to the wall of the heated mold. Layer upon layer continues to form until all of the resin has melted. As the temperature of the melted resin continues to rise the organic peroxide decomposes, initiating crosslinking of the resin.

Off-gas released by the decomposed peroxide migrates through the molten resin to the inside of the vented tank. Whenever crosslinking of the resin occurs too rapidly the off-gas is trapped within the wall. The rising temperature causes the trapped gas to expand in the now viscous resin, forming large tear drop shaped voids which often erupt on the inside wall of the molded tank.

Certain metal stearates appear to alter the rate of decomposition of the organic peroxide, thus allowing sufficient time for the off-gas to migrate to the inside of the tank and be vented.

DETAILED DESCRIPTION OF THE INVENTION

Polymers suitable for use in the invention include ethylene polymers broadly and are selected from homopolymers of ethylene and copolymers of ethylene and at least one straight and branched chain mono-1-olefin hydrocarbon having 3 to 8 carbon atoms per molecule and mixtures thereof. Because of availability, the preferred copolymers of ethylene are those employing straight chain comonomer hydrocarbons having 3 to 6 carbon atoms per molecule. Such copolymers are generally formed from at least 75 weight percent ethylene, although copolymers formed from at least 90 weight percent ethylene are more commonly produced. The polymers and copolymers used in the invention frequently have a melt index, as determined by ASTM D-1238, Condition E, of at least 10 and a density ranging from about 0.920 to about 0.970 gram/cm$^3$. Ethylene polymers employable in this invention can have transition metal catalyst residues exceeding 3 ppm (parts per million) and can be of the order of about 5 ppm without experiencing void problems. Thus, the polymers employed herein can be less expensive in that no purification step is required to reduce the transition metal catalyst residue below about 5 ppm.

Polymers other than polyethylene include, for example, copolymers of ethylene and propylene, isobutene, 1-pentene, 3-methyl-1-butene, 1-hexene, 4-methyl-1-pentene, 1-heptene, 1-octene and 4-ethyl-1-hexene.

Compounds suitable for use as crosslinking agents in accordance with the invention include for example the compounds disclosed in U.S. Pat. No. 3,214,422, issued to Mageli et al, Oct. 26, 1965. These compounds are acetylenic diperoxy compounds and include hexynes having the formula

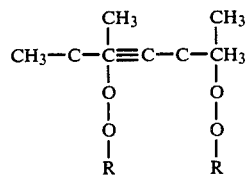

octynes having the formula

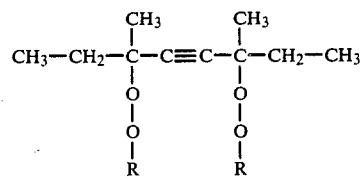

and octadiynes having the formula

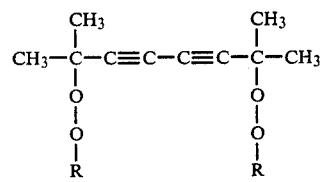

and wherein R is selected from the group consisting of tertiary alkyl, alkyl carbonate, and benzoate. In general, the molecular weights of polyperoxides fall with the range of 230 to 550. Among the compounds encompassed within the above-noted hexynes, octynes and octadiynes are included:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6-di(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(alpha-cumyl peroxy)hexyne-3
2,5-dimethyl-2,5-diperoxy ethyl carbonate)hexyne-3
1,4-tetraphenyl-1,4-(t,butylperoxy)butyne-2
2,5-Dimethyl-2,5-di(peroxy beta-chloroethyl carbonate)hexyne-3
2,5-Dimethyl-2,5-di(t-butylperoxy)hexyne-3

Because of their availability, a preferred group of peroxy compounds comprises hexynes and particularly 2,5-dimethyl-2,5-di(t-butylperoxy)hexyne-3. Such acetylenic diperoxy compounds can also contain minor amounts, e.g. up to 5 weight percent total, of other peroxy compounds such as for example 2,5-dimethyl-2,5-di(t-butylperoxy)hexane, t-butylhydroperoxide and 2,5-dimethyl-2, 5-dihydroperoxyhexane. If present, however, such peroxy compounds have been found to present no problems in this invention.

The amount of organic peroxide employed is a crosslinking amount which can be selected over a broad range. Generally the amount of the crosslinking agent employed, based on weight of polymer, ranges from about 0.1 to about 10 weight percent. Broad concentrations ranging from about 0.2 to about 5 weight percent based on the weight of the polymer can be employed. However, it has been found that the best properties of the rotationally molded article are obtained employing organic peroxide concentrations ranging from about 0.5 to about 1.0 percent based on the weight of the polymer.

A suitable metal salt employable in the invention can be derived from the reaction of the bicarbonates, carbonates, and hydroxides, etc., of zinc and the carboxylic acid.

The acid is a monocarboxylic acid of generic formula RCOOH where R is a linear hydrocarbyl group containing from about 10 to about 20 carbon atoms and from zero to two double bonds per molecule. Examples of such acids include decanoic, dodecanoic, tetradecanoic, octadecanoic, eicosanoic, trans-9-octadecanoic, cis-13-docosenoic, 9,12-octadecadienoic and the like including mixtures thereof. Because of the good results obtained therewith, octadenoic (stearic) acid is presently preferred.

A suitable metal stearate employable in the invention is zinc.

Any amount of metal salt can be used. However, it has been determined that the best results are obtained when the amount of metal salt incorporated in the rotational molding composition is in the range from about 0.005 to about 2.5 weight percent based on the weight of the total composition. To minimize the cost of the molded article the preferred weight of the metal stearate is from about 0.05 to about 1 weight percent.

The rotational molding compositions of this invention are prepared conventionally. When the starting ethylene polymer has been pelletized, the components can be blended by employing tumbling, shaking, etc. When the starting ethylene polymer is in fluff or powder form it is more convenient to employ a Henschel mixer to blend the additives. The resulting blends can then be finally compounded by means of an extruder, Banbury mixer, and the like at a temperature below the decomposition temperature of the organic peroxide crosslinking agent but above the melting point of the ethylene polymer and converted by conventional means into pellets, etc.

The temperatures employed in the rotational molding process can be from about 350° F. to 700° F. (204° C. to 391° C.) with intermediate ranges of about 450° F. to about 625° F. (232° C. to 329° C.) and about 525° F. to about 625° F. (274° C. to 329° C.). The best results, as evidenced by a lack of voids in the final rotationally molded articles, were obtained over a range of from 350° F. to 450° F. (177° C. to 232° C.).

EXAMPLE 1

Individual samples of polyethylene having a nominal melt index of 30 (ASMT D-1238, Condition E), a density of 0.964 g/cc (ASTM D-1505), ash content of 20 ppm and chromium catalyst residue content of 2 ppm were compounded with 0.04 wt. % dilaurylthiodi-propionate (DLTDP), 0.5 wt. % 2-hydroxy-4-octyloxybenzophenone (UV-531), 0.65 wt. % of 2,5-dimethyl-2,5-di-(t-butylperoxy)hexyne-3(DMPPH), and 0.1 wt. % of a metal stearate, when employed. Each sample was rotationally molded into a pipe of 6 inches (15.2 cm) outer diameter having ¾ inch (1.9 cm) thick walls and 20 inches (50.8 cm) in length by employing a mold temperature of 500° F. (260° C.) for one hour. After cooling to about 85° F. (30° C.), the molded pipe was removed and divided into 2 approximately equal portions by lengthwise sawing. The interior appearance and the number of bubbles visible to the unaided eye were then determined.

The metal stearate employed and the results obtained are presented in Table 1.

TABLE 1

Rotational Molding Of Crosslinkable Polyethylene Effects Of Presence Of Metal Stearates

| Run No. | Metal Stearate Wt. % | Metal Source | Observed Voids | Visual Appearance of Interior Surface |
|---|---|---|---|---|
| 1 | 0.1 | lithium | very small | small protruding plastic skins (blisters) |
| 2 | 0.1 | barium | 2 | smooth |
| 3 | 0.1 | magnesium | 0 | a few tiny cavities |
| 4 | 0.1 | cadmium | 3 | smooth |
| 5 | 0.1 | aluminum | 3 | a few tiny cavities |
| 5a | 0.1 | aluminum | 1 | smooth |
| 6 | 0.0 | control | 3 | smooth |

The results show in runs 2–5a that selected metal stearates of Periodic Groups II and IIIA do not affect void formation at the 0.1 wt. % level under the molding conditions employed. A Periodic Group IA metal stearate, in contrast, appeared to aggravate the void problem in this test series. In runs 5 and 5a, the metal stearates obtained from two different sources were used.

EXAMPLE 2

Another series of crosslinkable polyethylene compositions was compounded as before from samples of the same lot of resin, 0.04 wt. % DLTDP, 0.5 wt. % UV-531, 0.65 wt. % DMPPH, 0.05 wt. % of t-butylhydroperoxide (TBHP) and the designated metal stearate. Rotationally molded pipe was prepared from each sample as before. The results are given in Table 2.

TABLE 2

Rotational Molding Of Crosslinkable Polyethylene Effects Of Presence Of Alkyl Hydroperoxide And Metal Stearate

| Run No. | Wt. % | Metal Source | Observed Voids | Remarks | Interior Surface |
|---|---|---|---|---|---|
| 7 | 0.0 | none | 200 | control | smooth |
| 8 | 0.1 | none (titanium dioxide) | 160 | control | smooth |

The results in control run 7 show that the presence of only 0.05 wt. % of t-butylhydroperoxide in the composition greatly increases the propensity for void formation in the molded thick wall pipe compared to results obtained in its absence (control run 6 of Table 1). Control run 8 results indicate that titanium dioxide is ineffective as a void suppressor in the compositions.

EXAMPLE 3

A series of crosslinkable polyethylene compositions was compounded as before from the resin, 0.04 wt. % DLTDP, 0.5 wt. % UV-531, variable amounts of DMPPH and TBHP totaling 0.65 wt. %, and when employed, 0.1 wt. % zinc stearate as bubble suppressor. Rotationally molded pipe specimens were produced from each composition as before.

The compositions employed and results obtained are given in Table 3.

TABLE 3

Rotational Molding Of Crosslinkable Polyethylene
Effects Of Variable Peroxy Compounds Level and Zinc Stearate

| Run No. | Wt. % Peroxy Compound DMPPH[a] | TBHP[b] | Observed Voids | Remarks |
|---|---|---|---|---|
| 12 | 0.65 | 0.00 | 3 | control |
| 13 | 0.60 | 0.05 | 0 | control |
| 14 | 0.575 | 0.075 | 150 | control |
| 15 | 0.55 | 0.10 | 200 | control |
| 16 | 0.45 | 0.20 | 400 | control |
| 17 | 0.55 | 0.10 + 0.1 wt. % zinc stearate | 0 | invention |

[a] 2,5-dimethyl-2,5-di(t-butylperoxy)hexyne-3
[b] t-butylhydroperoxide

The results show that the number of voids sharply increase from about zero to near 150 when the TBHP content is greater than about 0.05 wt. % in the compositions. Indeed the number of voids continues to increase as the TBHP content is increased to at least 0.20 wt. %. Invention run 17 and control run 15 illustrates dramatically that the number of voids decreases from 200 to zero when 0.1 wt. % zinc stearate is included in the composition.

I claim:

1. A method for producing an essentially void-free article having a wall thickness of greater than ¼ inch, the method comprising rotationally molding a composition comprising (a) a polymer selected from the group consisting of an ethylene homopolymer, a copolymer of ethylene and at least one straight or branched chain mono-1-olefin hydrocarbon having 3 to 8 carbon atoms per molecule and mixtures thereof, (b) a crosslinking agent, and (c) a zinc salt of a monocarboxylic acid RCOOH, wherein R is a linear hydrocaryl group containing from about 10 to about 20 carbon atoms and from zero to two double bonds, the zinc salt being present in an amount of from 0.005 to about 2.5 weight percent, based on the weight of the composition.

2. The method of claim 1 wherein the zinc salt is zinc stearate.

3. The method of claim 2 wherein the molding composition further comprises at least about 0.05 weight percent of a peroxy compound selected from the group consisting of 2,5-dimethyl-2,5-di(t-butylperoxy) hexane, t-butylhydroperoxide, and 2,5-dimethyl-2,5-dihydroperoxyhexane.

4. The method of claim 1 wherein the molding composition further comprises t-butylhydroperoxide present in an amount of at least about 0.05 weight percent.

5. The method of claim 4 wherein the zinc salt is zinc stearate.

6. The method of claim 5 wherein the zinc stearate is present in an amount of from about 0.05 to about 1 weight percent, based on the weight of the composition.

7. The method of claim 6 wherein the crosslinking agent is 2,5-dimethyl-2,5-di(t-butylperoxy)hexyne-3 present within an amount of from about 0.1 to about 10 weight percent, based on the weight of the composition.

8. An essentially void-free rotationally molded article having a wall thickness greater than ¼ inch and produced according to the method of claim 1.

9. An essentially void-free rotationally molded article having a wall thickness greater than 0.25 inch and produced from a composition consisting essentially of:
a polymer selected from the group consisting of an ethylene homopolymer, a copolymer of ethylene and at least one straight or branched-chain mono-1-olefin hydrocarbon having 3 to 8 carbon atoms per molecule and mixtures thereof;
an acetylenic diperoxy crosslinking agent; and
a zinc salt of a monocarboxylic acid RCOOH, wherein R is a linear hydrocarbyl group containing from about 10 to about 20 carbon atoms and from zero to two double bonds, the zinc salt being present in an amount effective to reduce the incidence of voids in a rotationally-molded article prepared from the rotational molding composition.

* * * * *